United States Patent
Smith (10) Patent No.: US 12,410,590 B1
(45) Date of Patent: Sep. 9, 2025

(54) SUSTAINABLE WATER UTILIZATION AND DISASTER MITIGATION SYSTEM

(71) Applicant: Gregory Kent Smith, St. George's (BM)

(72) Inventor: Gregory Kent Smith, St. George's (BM)

(*) Notice: Subject to any disclaimer, the term of this patent is extended or adjusted under 35 U.S.C. 154(b) by 0 days.

(21) Appl. No.: 19/023,558

(22) Filed: Jan. 16, 2025

Related U.S. Application Data (60) Provisional application No. 63/728,188, filed on Dec. 5, 2024.

(51) Int. Cl.
| | |
|---|---|
| *E03B 1/02* | (2006.01) |
| *C02F 1/00* | (2023.01) |
| *E03B 3/02* | (2006.01) |
| *E03B 3/04* | (2006.01) |
| *E03B 11/12* | (2006.01) |
| *F03B 17/06* | (2006.01) |
| *C02F 103/00* | (2006.01) |

(52) U.S. Cl.
CPC ............ *E03B 1/02* (2013.01); *C02F 1/004* (2013.01); *E03B 3/02* (2013.01); *E03B 3/04* (2013.01); *E03B 11/12* (2013.01); *F03B 17/06* (2013.01); *C02F 2103/001* (2013.01); *C02F 2103/007* (2013.01); *F05B 2220/706* (2013.01)

(58) Field of Classification Search
CPC ..... E03B 1/02; E03B 3/02; E03B 3/04; E03B 11/12; C02F 1/004; C02F 2103/001; C02F 2103/007; F05B 2220/706
See application file for complete search history.

(56) References Cited

U.S. PATENT DOCUMENTS

| | | | |
|---|---|---|---|
| 3,980,894 A | 9/1976 | Vary | |
| 6,382,237 B1* | 5/2002 | Takai | E03B 3/02 220/567.1 |
| 7,025,887 B1* | 4/2006 | Kirts | B01D 21/0039 210/170.03 |
| 8,877,048 B1* | 11/2014 | Owings | E03F 1/002 210/170.03 |
| 9,409,799 B2 | 8/2016 | Mehl | |
| 9,534,658 B1 | 1/2017 | Rivas | |
| 9,752,550 B2 | 9/2017 | Bhende | |

(Continued)

*Primary Examiner* — Liam Royce
(74) *Attorney, Agent, or Firm* — Brennan, Manna & Diamond, LLC (57) ABSTRACT

The present invention is a water collection and storage station system. The system comprises one or more water tanks embedded in terrain such as natural mountains for water containment, storage, and directed outflow without requiring energy-intensive pumping, while also producing electricity. A high-altitude catchment area collects water, which is filtered through zeolite beds before storage. The system includes multiple exits for water distribution, overflow management, and debris removal. Each exit is integrated with hydroelectric generators for electricity production. The system features a heliport for firefighting support, equipped with rapid-fill mechanisms for flexible water buckets, thermal cameras for fire detection, and water cannons for fire suppression. The multifunctional system provides sustainable solutions for water conservation, energy generation, and disaster management.

9 Claims, 7 Drawing Sheets

(56) References Cited

U.S. PATENT DOCUMENTS

2006/0163147 A1\* 7/2006 Dierkes .................... E03F 5/16
                                                        210/207
2012/0175885 A1  7/2012 Peer
2018/0066419 A1\* 3/2018 Albers .................... C02F 1/001

\* cited by examiner

SUSTAINABLE WATER UTILIZATION AND DISASTER MITIGATION SYSTEM

CROSS-REFERENCE TO RELATED APPLICATION

The present application claims priority to, and the benefit of, U.S. Provisional Application No. 63/728,188, which was filed on Dec. 5, 2024, and is incorporated herein by reference in its entirety.

FIELD OF THE INVENTION

The present invention generally relates to water collection and management systems. More specifically, the invention relates to an integrated water collection and storage station designed to address global water concerns, including water scarcity, flood mitigation, and renewable energy generation. The system comprises a water tank embedded in a natural mountain, configured to store filtered precipitation and runoff water securely. The system features a high-altitude catchment area to collect precipitation, a zeolite filtration bed for removing contaminants, and multiple outlets (i.e., piped outlets) for water distribution, overflow management, and debris removal. Integrated hydroelectric generators generate renewable electricity. The invention also includes firefighting support features, such as thermal cameras, water cannons, and a heliport for rapid emergency response. Accordingly, the present disclosure makes specific reference thereto. Nonetheless, it is to be appreciated that aspects of the present invention are also equally applicable to other like applications, devices, and methods of manufacture.

BACKGROUND

By way of background, water is a fundamental and limited resource and is essential for the survival of all living organisms. Water scarcity, flooding, and contamination are global challenges faced by individuals. Rising temperatures, prolonged droughts, extreme precipitation, and frequent forest fires are also increasingly threatening the availability and quality of water resources worldwide. Most of the precipitation currently goes unused or causes damage, such as flooding, erosion, and water contamination. Precipitation runoff from highlands and mountains often devastates communities by washing away infrastructure and depositing contaminants into watersheds.

Precipitation, as one of the primary components of the water cycle, offers immense potential to meet global water, however, is not currently and efficiently harnessed and managed. Highlands and mountainous regions provide opportunity for reliable water collection. Properly capturing and storing the precipitation at its source can mitigate the need for extensive chemical treatments required for groundwater or surface water. Stored precipitation can serve as a crucial supply of clean drinking water for cities and towns, reducing dependency on aging and inefficient water systems. Individuals desire a system that can collect, save, and distribute precipitation efficiently to provide a greener, sustainable solution to global water concerns.

Therefore, there exists a long-felt need in the art for a sustainable system that provides a reliable solution for global water management challenges. There is a long-felt need for a system that minimizes water wastage, reduces dependency on aging water infrastructure, and prevents the damage caused by uncontrolled precipitation and runoff. Additionally, there is a long-felt need for an integrated system capable of addressing critical issues such as water scarcity, urban runoff management, flood mitigation, and forest fire control. Furthermore, there is a long-felt need for a system that is environmentally friendly, energy-efficient, and capable of generating renewable electricity during water collection and distribution processes. More specifically, there exists a long-felt need in the art for an improved water collection and storage system that can efficiently harness precipitation from high-altitude areas. Finally, there is a long-felt need for a system that is versatile, scalable, and equipped with features to support emergency services, such as firefighting operation.

The subject matter disclosed and claimed herein, in one embodiment, comprises an integrated water collection, storage, and management system designed to address global water concerns. The system includes at least one water tank embedded in a natural mountain and uses gravity to facilitate efficient water flow without the need for extensive pumping systems. The system features a high-altitude catchment area for collecting precipitation, which is filtered using a zeolite bed before storage in the tank. The system is equipped with multiple outlets (i.e., piped outlets), including a main water exit piped or directed to towns and cities, overflow exit to prevent overflow in the tank, and clean-out outlet to remove debris from the tank, each exit is integrated with hydroelectric generators to produce renewable energy. Additionally, the system includes firefighting support features, such as a heliport for water bucket refills, thermal cameras for fire detection, and water cannons for rapid fire suppression. The system will be automated online to cities and towns fire departments for staff safety.

In this manner, the water collection and storage system of the present invention accomplishes all of the foregoing objectives and provides a practical, sustainable solution for managing precipitation and runoff water. The system reduces energy consumption and offers a scalable solution for water conservation. The system uses zeolite filtration which enables clean water storage, suitable for drinking and other critical uses. The system includes thermal cameras, water cannons, and a heliport for disaster management in forested and mountainous areas, wherein the cameras detect fire and cannons are used for spraying water automatically. A plurality of hydroelectric generators are used in the system to generate electricity to power system operations and supply energy to nearby towns. The system addresses water scarcity, flood prevention, renewable energy generation, and emergency response.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a water collection and storage station system configured to collect, store, and manage precipitation and runoff water. The system comprises at least one water tank embedded in a natural mountain, the water tank is configured to store water, a catchment area is disposed at a high altitude for collecting precipitation, an inlet is configured to transfer filtered water from the catchment area to the water tank using gravity, a main water exit (i.e., piped exit) is configured to transfer water from the water tank to external locations using gravity, and a ventilation boundary is disposed around the water tank, the ventilation boundary facilitates airflow and providing access for maintenance. The system helps in addressing water concerns by collecting, saving, and efficiently managing precipitation and runoff water.

In another aspect, the water collection and storage station system is configured to support firefighting operations. For firefighting operations, the system includes at least one water tank embedded in a natural mountain, a heliport is disposed on or near the water tank for enabling helicopter landing and water bucket filling, a plurality of thermal cameras are disposed on thermal towers for detecting fire locations and intensities, water cannons are positioned around the system, and the water cannons are configured to spray water at high pressure for fire suppression.

In another embodiment, the catchment area is positioned at a high altitude to collect precipitation directly from the atmosphere. A zeolite filtered bed is disposed between the catchment area and the water tank for removing impurities from the collected precipitation. A tank door is configured to open and close the water tank, enabling filtered water entry and a flush exit is configured to clean the catchment area by removing contaminants before enabling precipitation to enter the water tank.

In one embodiment, a water collection and storage station system configured to manage urban precipitation runoff is disclosed. The system comprises at least one water tank, the water tank has at least a main water exit (i.e., piped exit) for towns, an overflow exit for preventing overflow in the tank, and a clean-out outlet for cleaning debris from the tank, a highway or road is connected to a plurality of inlets in the form of gutters or ditches, the inlets are configured to direct precipitation runoff into the water tank, a catchment area configured to collect additional precipitation runoff from urban areas, and a channel connects the water tank to urban distribution systems for providing stored water to cities and towns during droughts or water shortages. A plurality of generators are used in the system for generating electricity from water of the tank.

In another aspect, a ventilation screen is included in the system and the screen is made from corrosion-resistant stainless-steel mesh and is configured to provide 60-80% airflow for optimal ventilation.

In yet another aspect, the ventilation boundary includes adjustable openings to regulate airflow based on environmental conditions and enables automated adjustments to maintain optimal tank integrity and air quality.

In still another embodiment, for generating electricity, a hydroelectric generator is disposed in the main water exit (i.e., piped exit) for generating electricity as water exits the tank, a second hydroelectric generator is disposed in the clean-out outlet for generating electricity during debris removal, and a third hydroelectric generator disposed in the overflow exit for generating electricity during periods of excess precipitation.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a sustainable system that provides a reliable solution for global water management challenges. There is a long-felt need for a system that minimizes water wastage, reduces dependency on aging water infrastructure, and prevents the damage caused by uncontrolled precipitation and runoff. Additionally, there is a long-felt need for an integrated system capable of addressing critical issues such as water scarcity, urban runoff management, flood mitigation, and forest fire control. Furthermore, there is a long-felt need for a system that is environmentally friendly, energy-efficient, and capable of generating renewable electricity during water collection and distribution processes. More specifically, there exists a long-felt need in the art for an improved water collection and storage system that can efficiently harness precipitation from high-altitude areas. Finally, there is a long-felt need for a system that is versatile, scalable, and equipped with features to support emergency services, such as firefighting operation.

The present invention, in one exemplary embodiment, is a water collection and storage station system configured to collect, store, and manage precipitation and runoff water. The system comprises at least one water tank embedded in a natural mountain, the water tank is configured to store water, a catchment area is disposed at a high altitude for collecting precipitation, an inlet is configured to transfer filtered water from the catchment area to the water tank using gravity, a main water exit (i.e., piped exit) is configured to transfer water from the water tank to external locations using gravity, and a ventilation boundary is disposed around the water tank, the ventilation boundary facilitates airflow and providing access for maintenance. The system helps in addressing water concerns by collecting, saving, and efficiently managing precipitation and runoff water.

Reference will now be made in detail to the present preferred embodiments of the invention, examples of which are illustrated in the accompanying drawings. Wherever possible, the same reference numerals are used in the drawings and the description to refer to the same or like parts.

Figure 1:
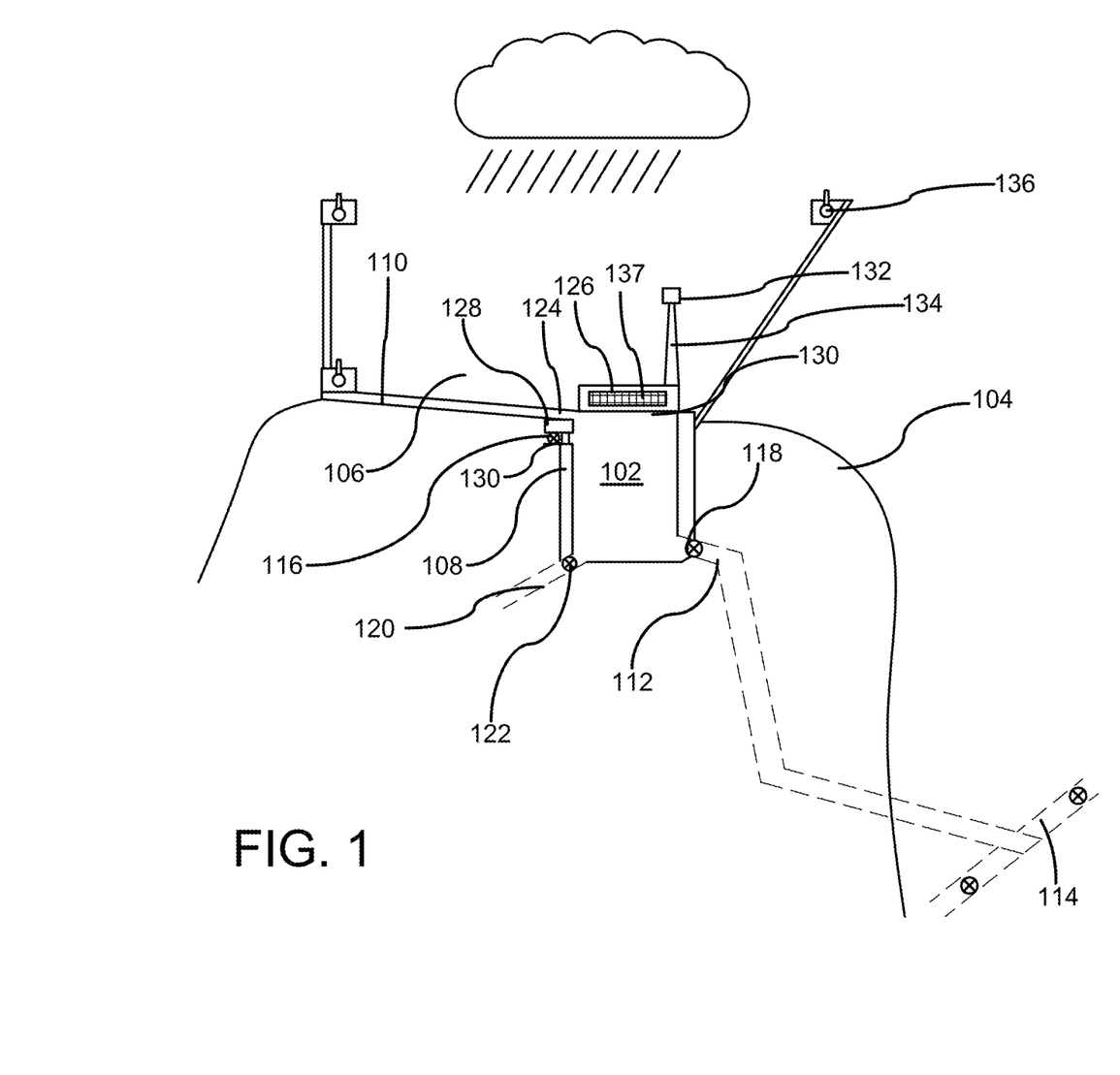
FIG. 1 illustrates a perspective view of one potential embodiment of water collection and storage station system of the present invention in accordance with the disclosed architecture.

Referring initially to the drawings, FIG. 1 illustrates a perspective view of one potential embodiment of water collection and storage station system of the present invention in accordance with the disclosed architecture. The water collection and storage station system 100 of the present invention is designed to address global water concerns by collecting, saving, and efficiently managing precipitation and runoff water. More specifically, the system 100 is configured to collect precipitation, prevent runoff damage, generate electricity, and help in firefighting. As illustrated, the system 100 includes at least one water tank 102 which is embedded in one or more natural mountain 104. The tank 102 is configured to store water and the mountains 104 function as natural high-altitude platforms for gravity-fed water system 100. The mountains 104 also provide space for embedding water tanks 102 and gravity is used to facilitate water flow without the need for extensive pumping systems. The water tank 102 preferably stores filtered water securely for distribution to cities, towns, or firefighting efforts. The water tank 102 is equipped with a plurality of exits for overflow, cleaning, and main water distribution as described later in the disclosure.

A catchment area 106 is also disposed in the system 100 and may be embedded in the mountains 104. The catchment area 106 is configured to collect rainfall and precipitation directly from the atmosphere, and/or snowmelt from the surrounding area. The catchment area 106 is preferably positioned at high or elevated altitudes to avoid contamination from the ground.

A ventilation boundary 108 also referred to as air and workspace is disposed around the tank 102 for providing ventilation around the water tank 102. The ventilation boundary 108 also facilitates easy access for maintenance and repairs of the corresponding water tank. The boundary 108 can be made of any durable and corrosion-resistant material and helps in maintaining integrity and shape of the tank 102. The water for storage in the tank 102 is received from the catchment area 106 via an inlet 110. The inlet 110 forms the entry point for filtered water from the catchment area 106 into the tank 102. The inlet 110 does not require any additional energy or pumping system for pumping the water from the catchment area 106 to the tank 102.

One advantage of the system 100 is that the water stored in the tank 102 can be transferred directly to cities and towns during droughts and to overcome water problems. A main water exit (i.e., main pipe exit) 112 is used for directing or piping stored water to cities, towns, and other areas requiring water supply (i.e., potable water). At least one channel and/or pipe 114 is used for transferring the water to the cities and towns and gravity is preferably used to transport water efficiently, reducing the need for pumping. In many cases, due to excessive rain or precipitation, the water tank 102 may overflow and for prevention of overflow of the tank 102, excess water can be redirected to one or more secondary tanks (not shown) via an overflow exit 116. The overflow exit 116 helps manage heavy precipitation in the catchment area 106.

A hydroelectric generator 118 is disposed in the main water exit (i.e., main pipe exit) 112 and can be selectively and independently activated for generating electricity for transmission to the towns and cities. The electricity can also be generated for providing power to one or more electrical components used in the system 100.

A clean-out outlet 120 is disposed in the tank 102 for removing debris from the tank 102 to maintain water quality of the tank 102. A second hydroelectric generator 122 can be disposed in the outlet 120 for generating electricity during water discharge from the clean-out outlet 120. For cleaning the precipitation collected in the catchment area 106, a flush exit 124 is disposed in the catchment area 106. The exit 124 is used to clean the initial precipitation from the catchment area 106 to remove contaminants, thereby enabling only clean water (i.e., potable water) for storage in the water tank 102.

A heliport 126 is included in the system 100 and is configured to provide a landing area for helicopters used in firefighting operations. The heliport 126 can be used for filling flexible water buckets quickly to combat forest fires. An additional hydroelectric generator 128 is also disposed in the water tank 102 for generating electricity. A hydroelectric generator 130 is also disposed in the flush exit 124 for generating electricity from the precipitation.

A plurality of thermal cameras 132 are disposed on thermal towers 134 and are used to detect forest fires by identifying heat sources such as flames. The thermal cameras 132 can provide real-time data on fire location and intensity and may automate activation of water cannons 136 for targeted firefighting. The water cannons 136 used in different embodiments of the present invention suppress fires by spraying large volumes of water at high pressure and can be positioned strategically around collection and storage stations for rapid deployment.

A screen 137 is disposed in the system 100 for providing proper air ventilation around the tank 102 and helps in preventing the build-up of moisture and harmful gases within the system 100. The screen 137 is preferably in the form of a mesh and is made from a corrosion-resistant and lightweight material. The screen is configured to enable at least 60-80% airflow therethrough for tank ventilation and minimizing moisture buildup.

Figure 2:
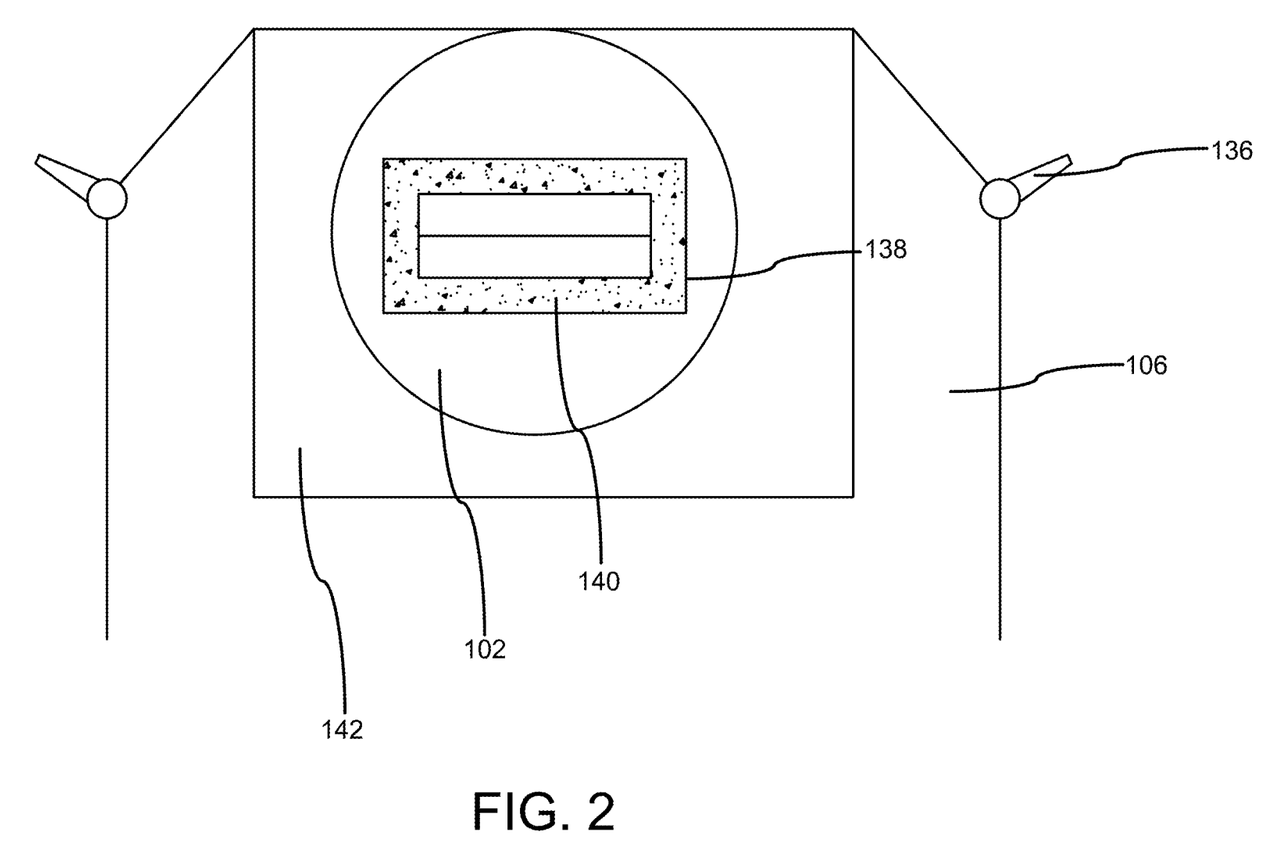
FIG. 2 illustrates a side perspective view of a water tank top door to enable water to filter through a zeolite filtered bed before entering the tank or water station in accordance with one embodiment of the present invention.

FIG. 2 illustrates a side perspective view of a water tank top door to enable water to filter through a zeolite filtered bed before entering the tank in accordance with one embodiment of the present invention. The system 100 uses at least one Zeolite filtered bed 138 for filtering water entering the tank to remove impurities and contaminants. The bed 138 is preferably made of Zeolite 140 and is preferably positioned between the catchment area 106 and the tank entrance 110. The tank 102 also includes at least one tank door 142 for opening and closing the tank 102.

Figure 3:
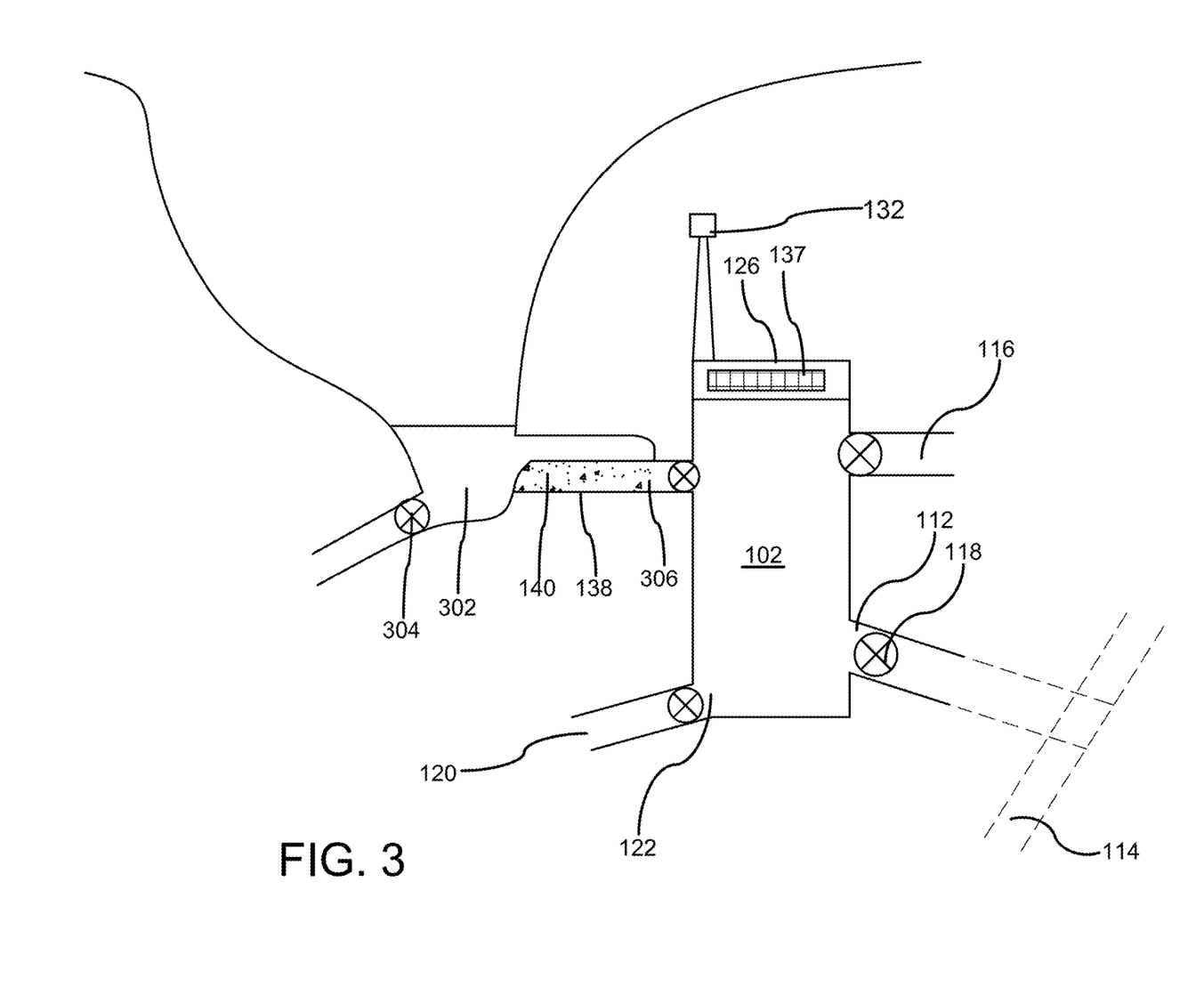
FIG. 3 illustrates a perspective view showing of another embodiment of the water station system of the present invention in accordance with the disclosed structure.

FIG. 3 illustrates a perspective view showing of another embodiment of the water station system of the present invention in accordance with the disclosed structure. As illustrated, in the present embodiment, the Zeolite bed 138 containing a plurality of Zeolites 140 is disposed in a dam 302 which can collect water from precipitation, runoff, springs, rivers, lakes, and snowmelt from mountains 104. A dam hydroelectric generator 304 is disposed in the dam 302 and clean out water is transmitted from the dam 302 via the channel 306. The clean-out outlet 120 is disposed in the tank 102 for removing debris from the tank 102 to maintain water quality of the tank 102 and is coupled with hydroelectric generator 122. It should be noted that the water station of the present embodiment is designed to work with one or more dams and all other components work in the same way as mentioned earlier in FIG. 1. The dam 302 is used to stop precipitation runoff in specific paths to prevent flooding and redirect collected runoff water into tanks for storage and later use.

Figure 4:
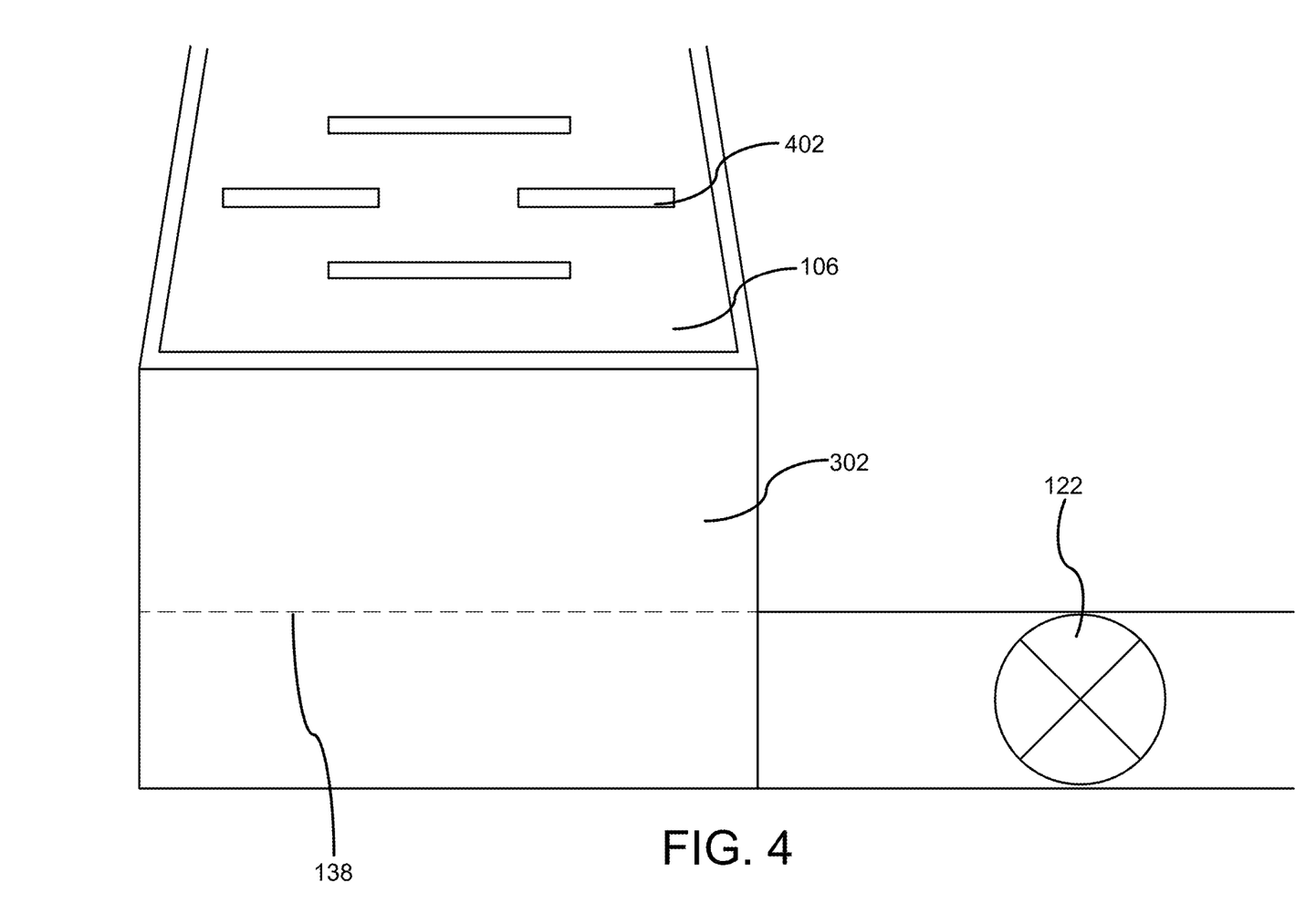
FIG. 4 illustrates a top view of the water station used in the system of the present invention in accordance with the disclosed structure.

FIG. 4 illustrates a top view of the water station used in the system of the present invention in accordance with the disclosed structure. In the present embodiment, a plurality of rock barricades 402 are disposed in front of the catchment area 106 to prohibit rocks and to slow down floodwaters before being collected by the catchment area 106. The rock barricades 402 are configured to stop rocks from moving into dam 302. The rock barricades 402 also protect the Zeolite bed 138 from physical impact.

Figure 5:
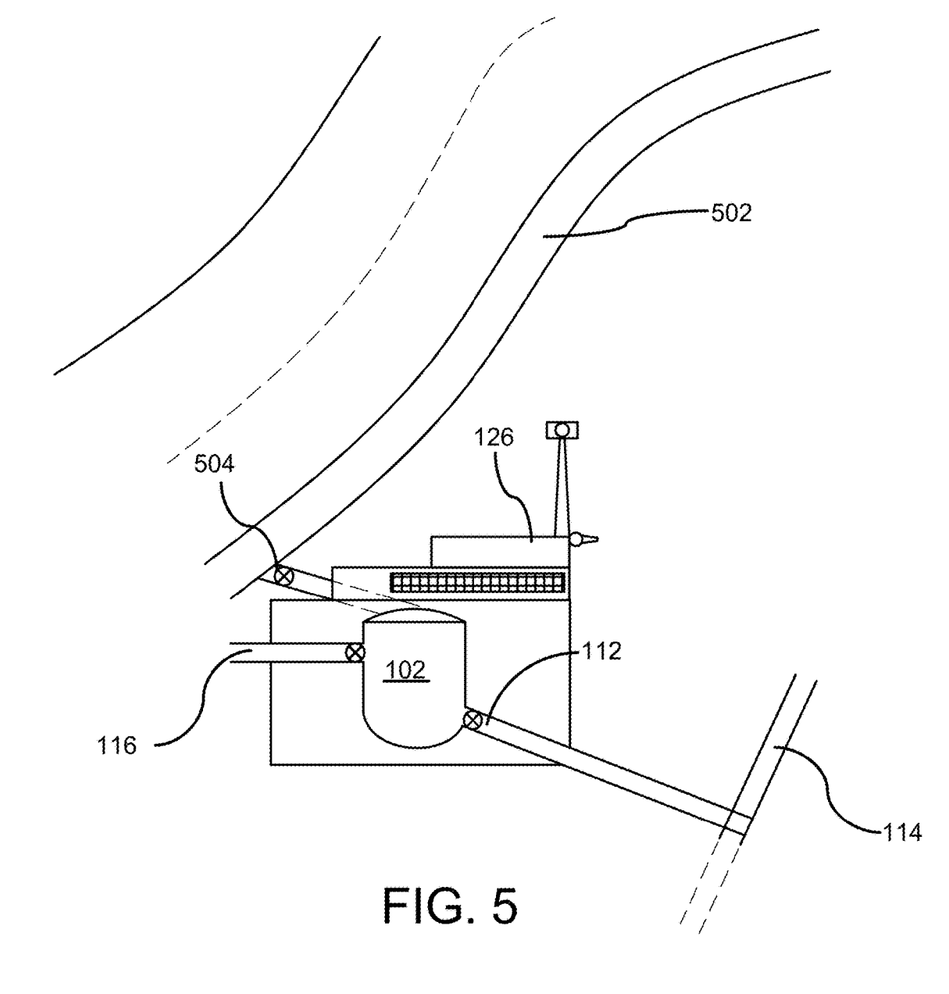
FIG. 5 illustrates a perspective view of the water station of the present invention with a highway or a road being used as water catchment to direct precipitation runoff into the system.

FIG. 5 illustrates a perspective view of the water station of the present invention with a highway or a road being used as water catchment to direct precipitation runoff into the system. In the present embodiment, a highway or a road 502 is connected to one or more inlets 504 which can be in the form of gutters or ditches and the collected water is transported to the tank 102. The tank 102, similar to FIG. 1, has a plurality of outlets including clean-out outlet 120, main water exit (i.e., piped exit) 112, and overflow exit 116. The present embodiment is useful to provide additional sources of water collection in populated areas. Further, the system helps manage urban water runoff efficiently.

Figure 6:
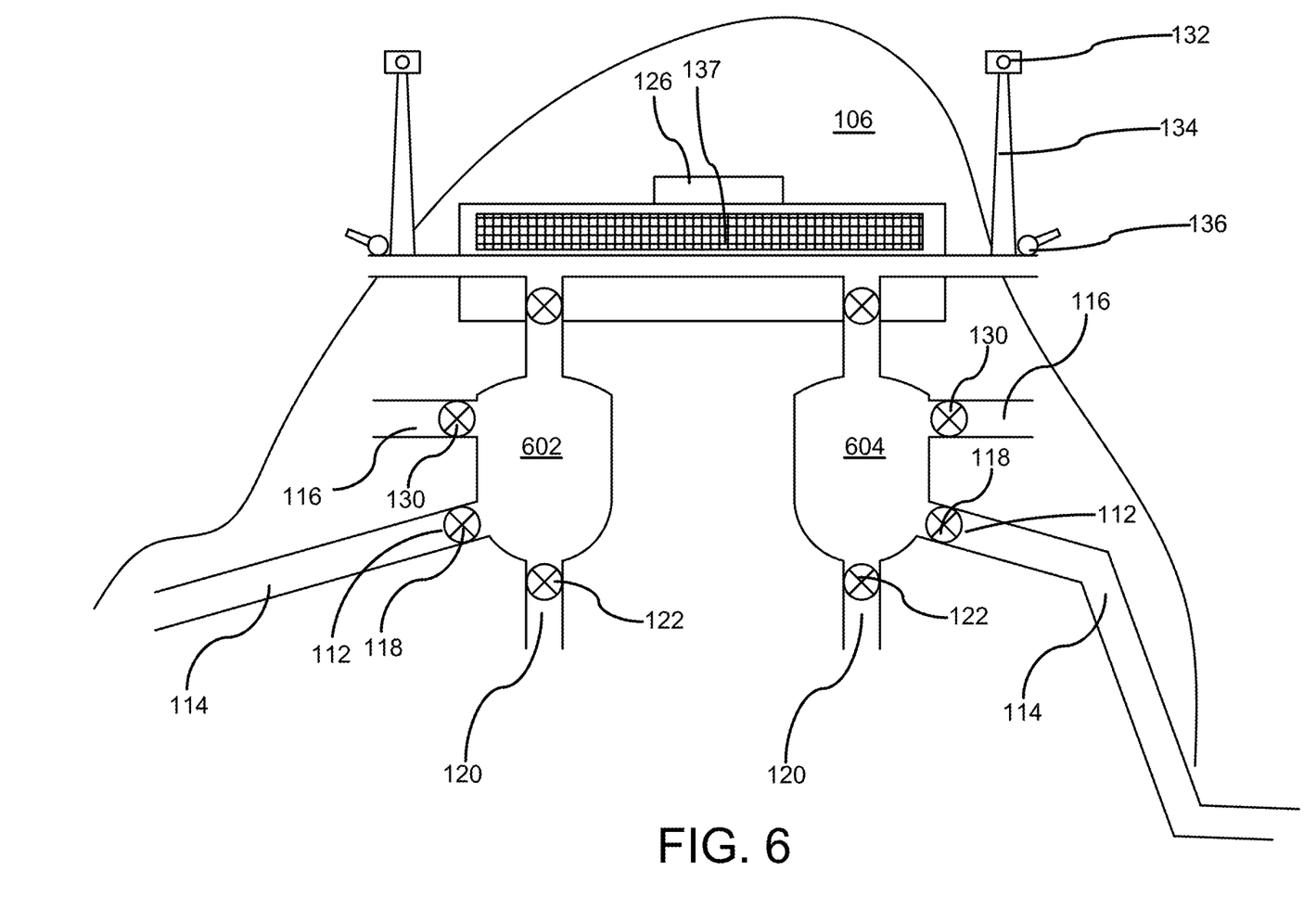
FIG. 6 illustrates the water station system of the present invention being used with mountainous terrain in accordance with one embodiment of the present invention.

FIG. 6 illustrates the water station system of the present invention being used in mountainous terrain in accordance with one embodiment of the present invention. As illustrated, in the present embodiment, two tanks 602, 604 are used and can be identical or different based on the requirements of the users. Each tank 602, 604 receives water from the catchment area 106 and has corresponding clean-out outlet 120, main water exit 112, and overflow exit 116 along with respective hydroelectric generator. The system 600 is designed to optimize water collection based on the shape of the terrain and the mountain.

Figure 7:
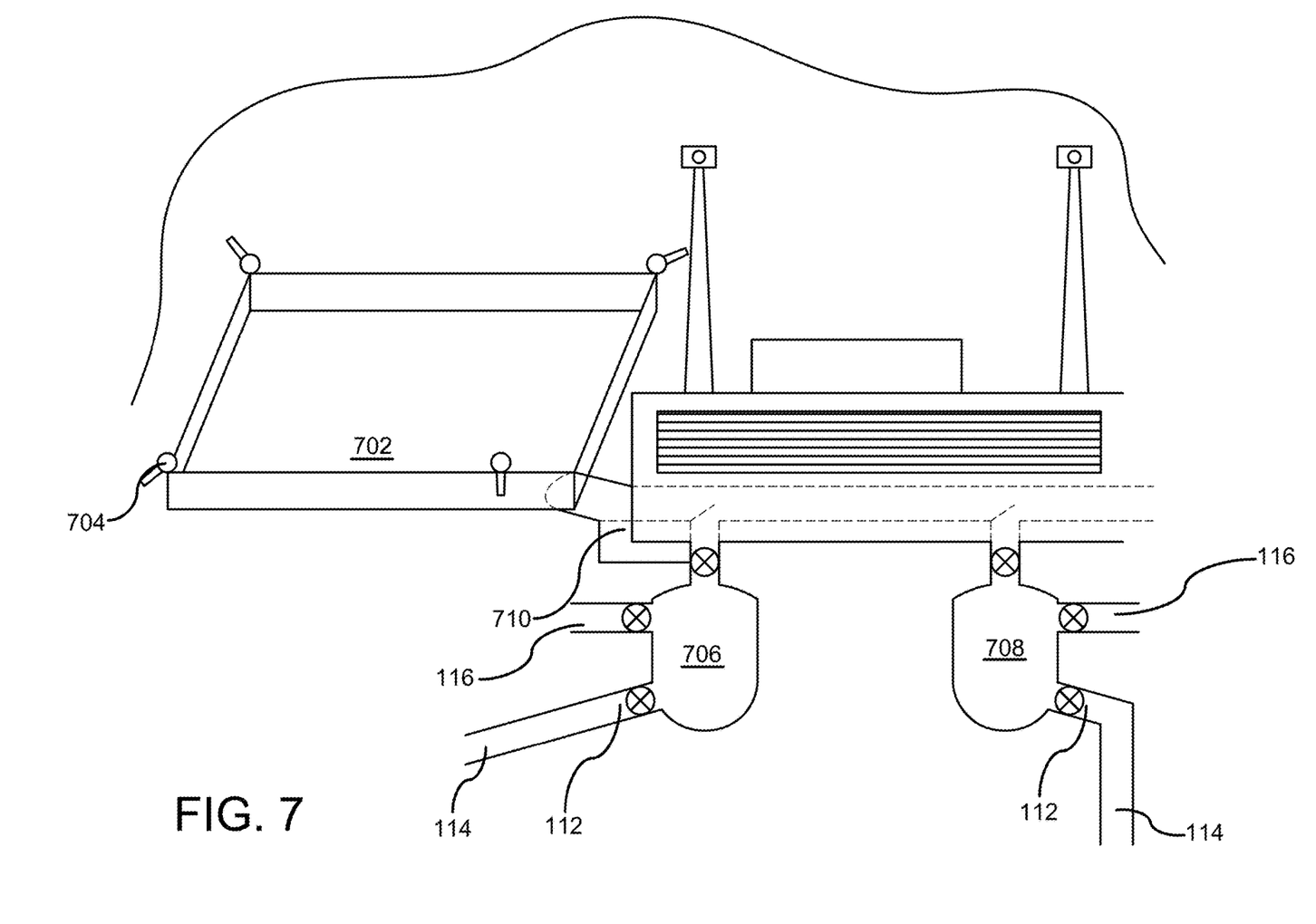
FIG. 7 illustrates a side perspective view of a flat mountain top with the integrated water station system in accordance with the disclosed structure.

FIG. 7 illustrates a side perspective view of a flat mountain top with the integrated water station system in accordance with the disclosed structure. In the present embodiment, the catchment area 702 has a plurality of water cannons 704 and the catchment area 702 is associated with tanks 706, 708 via an inlet 710. The tanks 706, 708 have corresponding clean-out outlet 120, main water exit 112, and overflow exit 116 along with respective hydroelectric generator. The screen 137 is disposed in the system 100 for providing proper air ventilation around the tank 102 and helps in preventing the build-up of moisture and harmful gases within the system 100.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "sustainable precipitation utilization and disaster mitigation system", "water station system", "advanced water conservation and hydroelectric generation system", "gravity-fed water storage and firefighting system", and "system" are interchangeable and refer to the sustainable precipitation utilization and disaster mitigation system 100 of the present invention.

Notwithstanding the forgoing, the sustainable precipitation utilization and disaster mitigation system 100 of the present invention can be of any suitable size and configuration as is known in the art without affecting the overall concept of the invention, provided that it accomplishes the above stated objectives. One of ordinary skill in the art will appreciate that the sustainable precipitation utilization and disaster mitigation system 100 as shown in the FIGS. are for illustrative purposes only, and that many other sizes and shapes of the sustainable precipitation utilization and disaster mitigation system 100 are well within the scope of the present disclosure. Although the dimensions of the sustainable precipitation utilization and disaster mitigation system 100 are important design parameters for user convenience, the sustainable precipitation utilization and disaster mitigation system 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A water collection and storage station system comprising:
    a catchment area for collecting the water;
    a plurality of water flow outlets;
    an inlet; and
    a ventilation boundary;
    a water storage tank embedded in a natural mountain;

wherein said catchment area is embedded in the natural mountain;

wherein said ventilation boundary is disposed around said water storage tank for providing ventilation around said water storage tank;

wherein said inlet receives the water from said catchment area to said water storage tank;

wherein said inlet has a filtering bed for filtering water from said catchment area;

wherein the water is collected from the group consisting of precipitation, runoff, springs, rivers, lakes, and snowmelt from mountains; and further wherein the water is gravity fed from said catchment area to said inlet.

2. The water collection and storage station system of claim 1 further comprising a water exit.

3. The water collection and storage station system of claim 2, wherein said water exit is an overflow water exit for directing the water from said water storage tank.

4. The water collection and storage station system of claim 3, wherein said water exit has a first hydroelectric generator disposed in said water exit for generating electricity from the water passing through said first hydroelectric generator.

5. The water collection and storage station system of claim 4, wherein said water storage tank has a clean-out outlet for removing debris from said water storage tank.

6. The water collection and storage station system of claim 5 further comprising a flush exit, wherein said flush exit is between said catchment area and said water storage tank for cleaning the water collected in said catchment area.

7. The water collection and storage station system of claim 6 further comprising a heliport, wherein said heliport is proximal to said catchment area for providing a landing area for a helicopter to fill flexible water buckets in said catchment area.

8. The water collection and storage station system of claim 6, wherein said flush exit has a second hydroelectric generator for generating electricity from the water passing through said second hydroelectric generator.

9. The water collection and storage station system of claim 6, wherein the filtering bed is a zeolite filter bed positioned between said water storage tank and said catchment area for filtering the water before entering said water storage tank.

* * * * *